US012703288B2

(12) United States Patent
Fujan et al.

(10) Patent No.: US 12,703,288 B2
(45) Date of Patent: Aug. 11, 2026

(54) DUMP BODY WITH FACETED SHAPE

(71) Applicant: Caterpillar Global Mining Equipment LLC, Denison, TX (US)

(72) Inventors: Steven J. Fujan, Oro Valley, AZ (US); Earl Richard Thompson, Oro Valley, AZ (US); Nathan R. Wagner, Tucson, AZ (US); Vaitheeswaran Ponnuchamy, Chennai (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 321 days.

(21) Appl. No.: 18/411,457

(22) Filed: Jan. 12, 2024

(65) Prior Publication Data

US 2025/0229693 A1 Jul. 17, 2025

(51) Int. Cl.
*B60P 1/28* (2006.01)
*B60P 1/16* (2006.01)

(52) U.S. Cl.
CPC ................ *B60P 1/286* (2013.01); *B60P 1/16* (2013.01); *B60Y 2200/142* (2013.01)

(58) Field of Classification Search
CPC ....... B60P 1/16; B60P 1/286; B60Y 2200/142
See application file for complete search history.

(56) References Cited

U.S. PATENT DOCUMENTS 6,520,590 B2 2/2003 Feuereisen Azocar et al.
7,025,407 B2 4/2006 Medel
9,272,652 B2 3/2016 Garcia-Huidobro Valdivieso et al.
11,440,454 B2 9/2022 De Jager et al.
2014/0054925 A1 2/2014 Hyde et al.
2017/0036587 A1* 2/2017 Ozigbu ..................... B60P 1/24
2019/0263311 A1 8/2019 Robbs
2020/0001766 A1* 1/2020 Maiorana ................ B60P 1/286
2021/0114504 A1 4/2021 Hall et al.
2022/0032832 A1 2/2022 Arul

FOREIGN PATENT DOCUMENTS

AU 2019200745 B2 1/2021
CN 113650543 A 11/2021
EP 0703115 B1 1/1998
JP 2018-171946 A 11/2018
WO 2013091007 A1 6/2013
WO WO-2018081316 A1 * 5/2018 .............. B60P 1/286

OTHER PUBLICATIONS

Written Opinion and International Search Report for Int'l. Patent Appln. No. PCT/US2024/060438, mailed Apr. 9, 2025 (9 pgs).

* cited by examiner

*Primary Examiner* — Edwin A Young

(57) ABSTRACT

It is advantageous for the dump body of a mining or off-road truck to be both strong and lightweight. Accordingly, a dump body with a faceted floor is disclosed. The dump body comprises a floor formed from a plurality of planar plates, arranged in two dimensions, and joined at angles to form a pseudo-curvature. The planar plates are easy and inexpensive to manufacture, and the angled joints provide rigidity that eliminates the need for external stiffeners, thereby maintaining the strength of the dump body while decreasing the weight and cost of the dump body.

20 Claims, 5 Drawing Sheets

DUMP BODY WITH FACETED SHAPE

TECHNICAL FIELD

The embodiments described herein are generally directed to a dump body, and, more particularly, to a dump body with a faceted shape.

BACKGROUND

There is a desire in the off-road and mining industries for low-cost dump bodies that are also lightweight. A lighter weight body allows more payload to be hauled, increases the productivity of the truck, and reduces the total cost of ownership.

Conventional dump bodies with flat floors require a multitude of stiffeners distributed throughout the exterior of the body to provide support to the flat floor. These stiffeners add weight and cost to the dump body.

The need for stiffeners can be reduced by curving the floor of the dump body. U.S. Pat. Nos. 11,440,454, 9,272,652, and 6,520,590 each describe an example of a curved dump body. However, curving the dump body in this manner increases the cost of the dump body.

The present disclosure is directed toward overcoming one or more of the problems discovered by the inventors.

SUMMARY

In an embodiment, a dump body for a mobile equipment comprises: a floor comprising a plurality of plates arranged in two dimensions, including a front-to-rear dimension and a side-to-side dimension, wherein each of the plurality of plates is planar, and wherein, in both the front-to-rear dimension and the side-to-side dimension, each of the plurality of plates is joined to each adjacent plate at an angle.

In an embodiment, a dump body comprises: a floor comprising a plurality of plates arranged in two dimensions, including a front-to-rear dimension and a side-to-side dimension, wherein each of the plurality of plates is planar, and wherein, in both the front-to-rear dimension and the side-to-side dimension, each of the plurality of plates is joined to each adjacent plate at an angle; a front wall joined to a front edge of the floor; two side walls joined to two side edges of the floor and two side edges of the front wall; a cab protector extending forward from an edge of the front wall that is opposite an edge of the front wall that is joined to the floor; and a pair of attachment beams extending in the front-to-rear dimension on a bottom side of the floor.

In an embodiment, a mobile equipment comprises: a frame; a plurality of ground-engagement members attached to the frame; a cab attached to the frame; a dump body that includes a floor comprising a plurality of plates arranged in two dimensions, including a front-to-rear dimension and a side-to-side dimension, wherein each of the plurality of plates is planar with beveled edges, and wherein, in both the front-to-rear dimension and the side-to-side dimension, each of the plurality of plates is joined to each adjacent plate at an angle, a front wall joined to a front edge of the floor, two side walls joined to two side edges of the floor and two side edges of the front wall, a cab protector extending, over the cab, from an edge of the front wall that is opposite an edge of the front wall that is joined to the floor, and a pair of attachment beams extending in the front-to-rear dimension on a bottom side of the floor, wherein each of the pair of attachment beams comprises a frame engagement element and a piston engagement element, and wherein the dump body is connected to the frame by the frame engagement element of each of the pair of attachment beams; and a pair of pistons that each comprises a first end and a second end, wherein the first end of each of the pair of pistons is connected to the frame, and wherein the second end of each of the pair of pistons is connected to the piston engagement element of a respective one of the pair of attachment beams.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
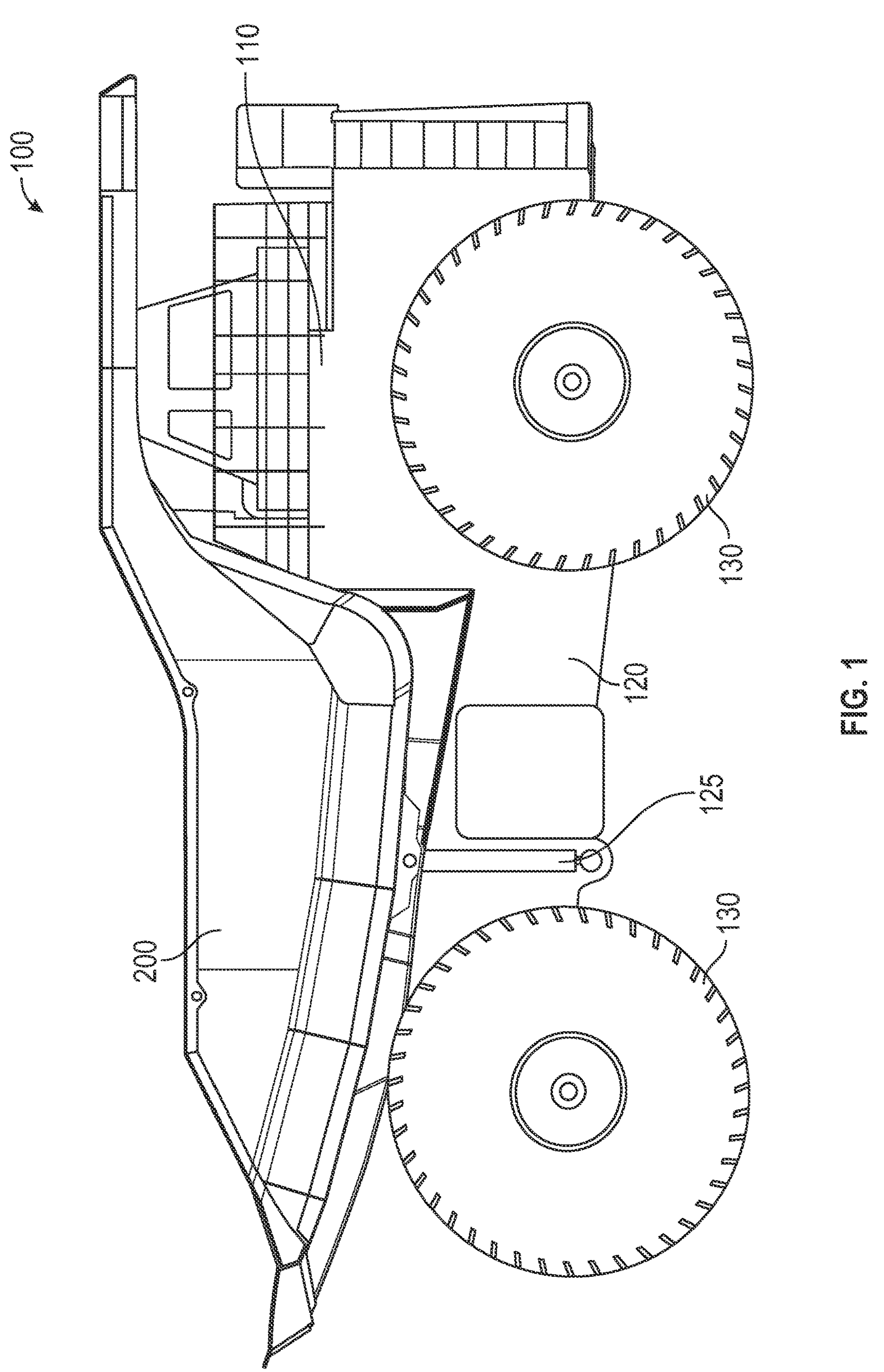
FIG. 1 illustrates a side view of a mobile equipment having a dump body, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

FIG. 1 illustrates a side view of a mobile equipment 100 having a dump body 200, according to an embodiment. Mobile equipment 100 is illustrated as a mining truck, such as models 785, 789, 793, 794, 796, 797, or 798 of mining trucks offered by Caterpillar Inc. ("Caterpillar") of Peoria, Illinois. However, mobile equipment 100 may be any equipment that comprises a dump body, including off-highway trucks (e.g., models 770, 772, 773, 775, or 777) and three-axle articulated trucks (e.g., models 725, 730, 735, 740, or 745) offered by Caterpillar. Mobile equipment 100 may be operated by a human (e.g., locally or remotely) and/or by an autonomous system. In addition, mobile equipment 100 may be powered by an internal combustion engine and/or may be electrically powered by an on-board battery pack.

In the illustrated example, mobile equipment 100 comprises a front portion 110 and a rear portion 120 integrated in a single body frame. In an alternative embodiment, the frame of mobile equipment 100 may comprise an articulated front portion 110 and rear portion 120 that are capable of rotating within a range of degrees, relative to each other, around a vertical axis. In either case, rear portion 120 includes a dump body 200. Rear portion 120 may also comprise a pair of pistons 125 (e.g., hydraulic pistons) that are connected, on one end, to rear portion 120 and, on the opposing end, to a front end of dump body 200. When actuated, each piston 125 may extend to lift the front end of dump body 200, such that material carried within dump body 200 will flow out the rear of dump body 200.

Dump body 200 may be designed and configured for the efficient, loading, transportation, and unloading of any type of material. These types of material may include dirt, gravel, sand, demolition waste, and/or the like. Dump body 200 may be constructed from heavy-duty and wear-resistant materials, like high-strength tempered steel (e.g., 400 to 500 Brinell Hardness Number) such as Hardox®, and engineered to withstand the weight and abrasive properties of the loads it carries.

Mobile equipment 100 may comprise at least one, and generally a plurality of, ground-engaging members 130. Ground-engaging members 130 are illustrated as wheels with tires. In an alternative embodiment, ground-engaging members 130 may comprise a track or pair of tracks. More generally, ground-engaging member(s) 130 may comprise any mechanism for supporting mobile equipment 100 above the ground, and preferably moving mobile equipment 100 relative to the ground.

Figure 2A:
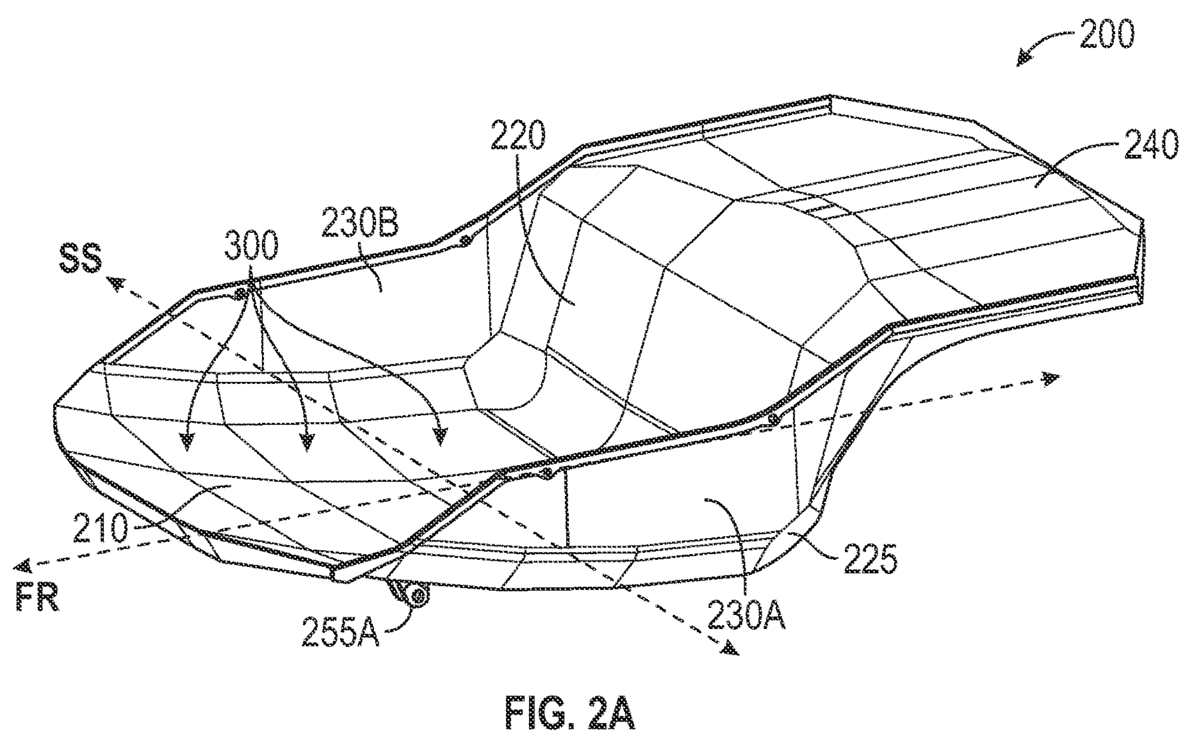
FIGS. 2A-2F illustrate various views of a dump body in isolation, according to an embodiment.
Figure 2B:
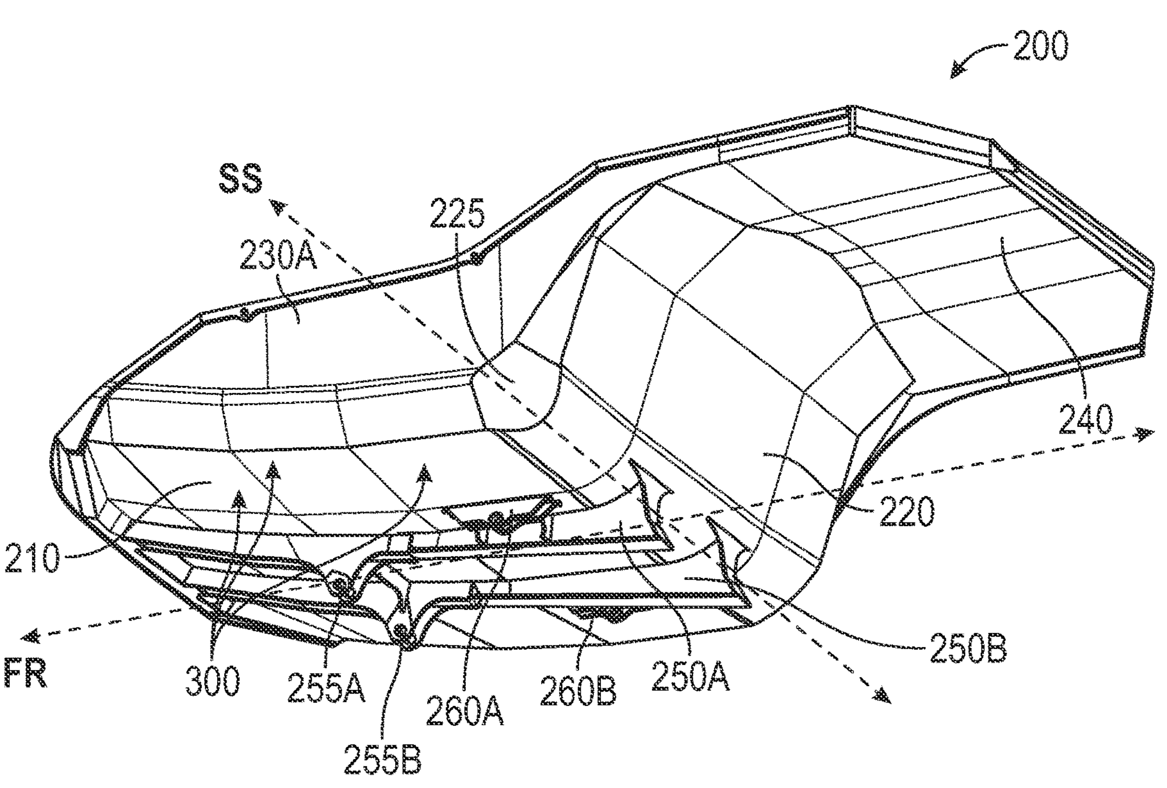
Figure 2C:
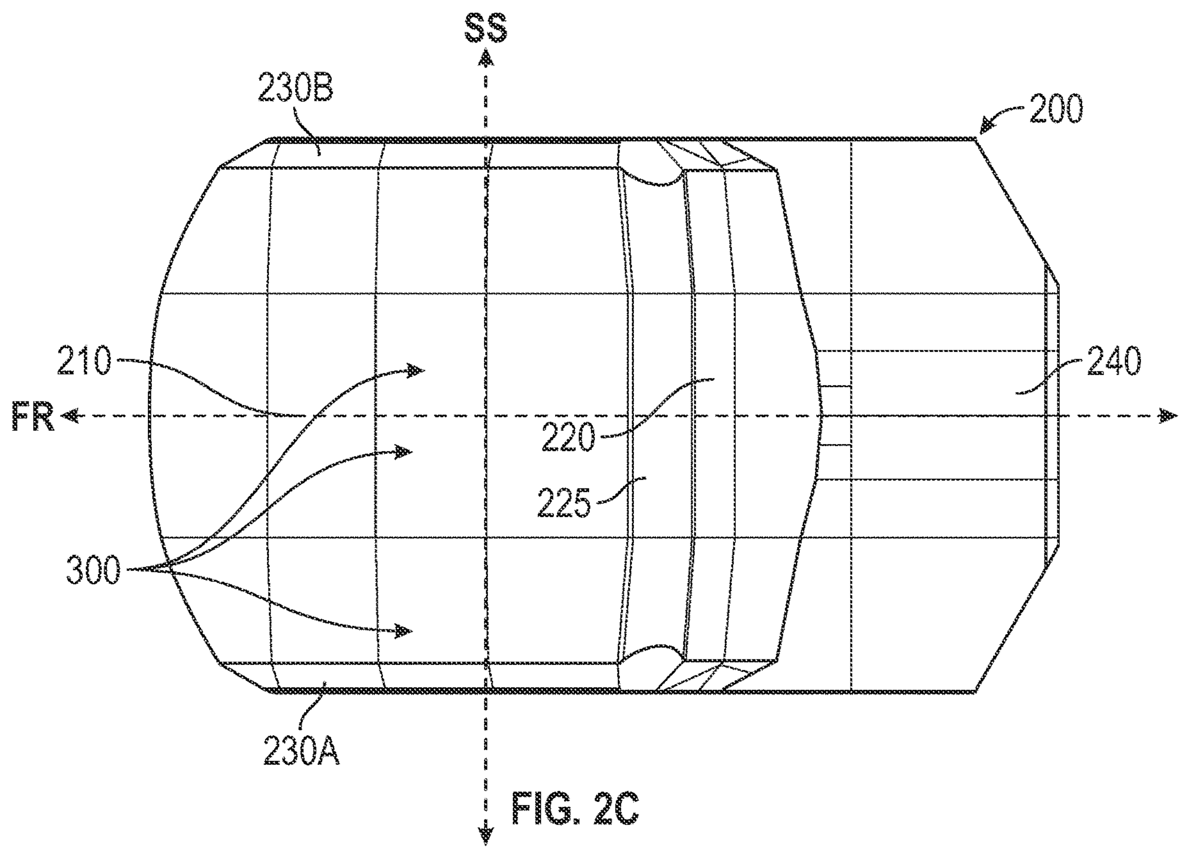
Figure 2D:
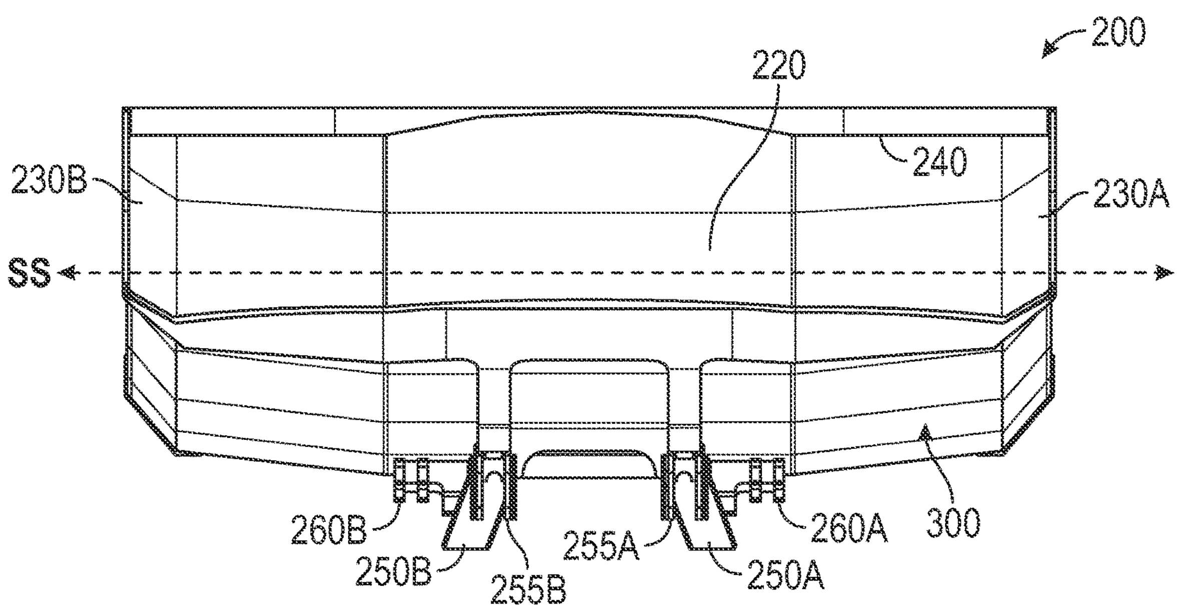
Figure 2E:
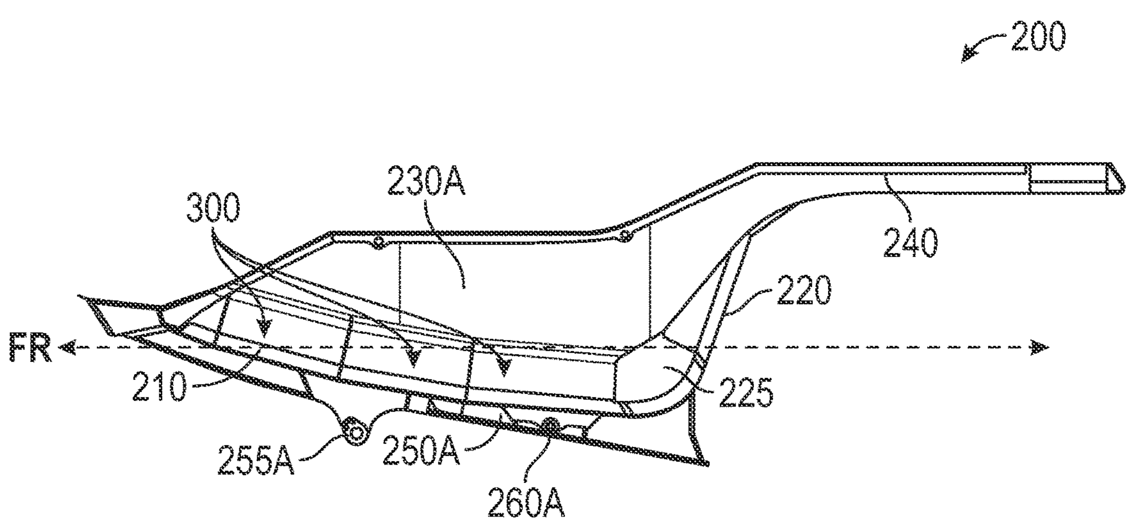
Figure 2F:
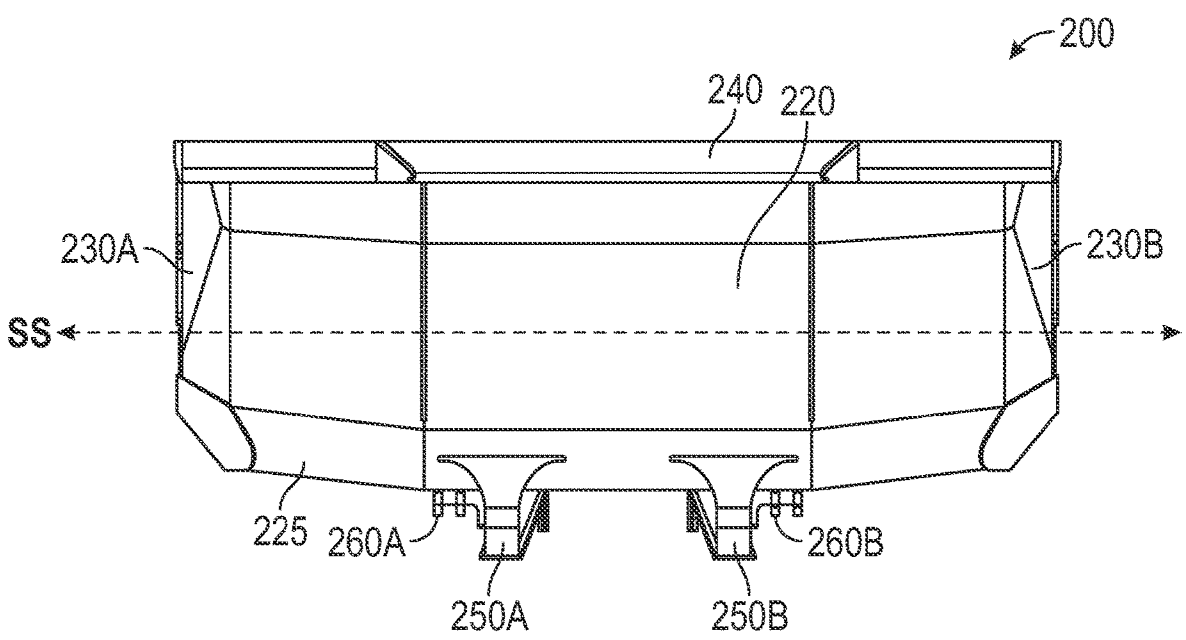

FIGS. 2A-2F illustrate various views of dump body 200 in isolation, according to an embodiment. In particular, FIG. 2A is an elevated perspective view, FIG. 2B is a depressed perspective view, FIG. 2C is a top-down view, FIG. 2D is a rear view, FIG. 2E is a side view, and FIG. 2F is a front view, according to an embodiment of dump body 200.

Dump body 200 includes a floor 210, which is configured to support the load on dump body 200, a pair of side walls 230 (e.g., including 230A and 230B), a front wall 220 connected to floor 210 by a radius cove 225, a cab protector 240, a pair of attachment beams 250A and 250B, and a pair of piston engagement elements 260A and 260B. As used herein, a reference numeral without an appended letter, but with the same numerical component as a reference numeral with an appended letter, will be used to refer to that component generically. For example, the term "side wall 230" may refer to either side wall 230A or side wall 230B, and the term "side wall 230" may refer collectively to side walls 230A and 230B.

Floor 210 forms the bottom boundary of dump body 200. Floor 210 is configured to support the load of material carried within dump body 200. In an embodiment, floor 210 comprises a plurality of plates 300 that are joined together at angles to define a faceted floor 210. Each plate 300 may be joined to each adjacent plate 300 by welding. While the description will primarily refer to welding when discussing the joining of separate pieces of material, it should be understood that anywhere herein in which welding is mentioned, any other suitable technique for joining separate pieces of material may be used instead. As an alternative to welding, the plurality of plates 300 may be formed as a single piece of material that is bent to form the angles between adjacent plates 300. In other words, the plurality of plates 300 are joined by virtue of being fabricated as a single piece of material, and then each of the plurality of plates 300 is defined by bending the single piece of material. It should be understood that each bend will represent a joint between two adjacent plates 300. As yet another alternative, a first subset of the plurality of plates 300 may be joined to adjacent plates 300 by welding, while a second subset of the plurality of plates 300 may be formed as a single piece of material that is bent to form the angles between adjacent plates 300.

The plurality of plates 300 is arranged in two dimensions, including a front-to-rear dimension FR and a side-to-side dimension SS. Each of the plurality of plates 300 may be flat or planar and generally rectangular in shape. In both front-to-rear dimension FR and side-to-side dimension SS, each of the plurality of plates 300 may be joined to each adjacent plate at an angle. In each of one or both of front-to-rear dimension FR and side-to-side dimension SS, adjacent pairs of the plurality of plates 300 may be joined at the same angle as every other adjacent pair of the plurality of plates 300 in the respective dimension. Alternatively, in each of one or both of front-to-rear dimension FR and side-to-side dimension SS, at least one adjacent pair of the plurality of plates 300 may be joined at a different angle than at least one other adjacent pair of the plurality of plates 300 in the respective dimension. In either case, at least one adjacent pair of the plurality of plates 300 in front-to-rear dimension FR may be joined at a different angle than at least one adjacent pair of the plurality of plates 300 in side-to-side dimension SS. Adjacent pairs of the plurality of plates 300 may be joined at any angle, but preferably within a range of 4 to 7 degrees, and more preferably in a range of 5 to 6.5 degrees. In a particular embodiment, in front-to-rear dimension FR, adjacent plates are joined at an angle of around 5 degrees, and in side-to-side dimension SS, adjacent plates are joined at an angle of 6.5 degrees.

The joinder of the plurality of plates 300 at angles in this manner provides a pseudo-curvature to floor 210. The plurality of planar plates 300 can be thought of as "facets" comprising a generally curved overall shape. The overall shape of floor 210 may be similar to the bowl of a spoon, with a concave surface that is deepest at or near the front and becoming shallower from the front towards the rear in front-to-rear dimension FR, and having a symmetrical pseudo-curved shape in side-to-side dimension SS. Because of the pseudo-curvature, plates 300 of dump body may be self-supporting, and floor 210 does not require a multitude of stiffeners (e.g., on the bottom side of floor 210) to support floor 210 when a load is applied. The elimination of external stiffeners reduces the cost to manufacture dump body 200 and reduce the overall weight of dump body 200 and mobile equipment 100. In addition, damage to floor 210 may be more easily repaired by simply cutting out the damaged plate 300 and welding in a new plate 300.

Front wall 220 forms the front boundary of dump body 200. A bottom edge of front wall 220 is joined to a front edge of floor 210, for example, by welding. In an embodiment, front wall 220 comprises a radius cove 225 that is joined to the front edge of floor 210. Radius cove 225 forms a smoothly curved transition between floor 210 and a substantially linear middle portion of front wall 220. Radius cove 225 eliminates or reduces sharp angles or corners at the joint between floor 210 and front wall 220, which can be points of stress concentration and weakness on dump body 200. Radius cove 225 may also aid in the efficient and controlled unloading of materials, by ensuring that material within dump body 200 does not get stuck or hung up in corners of dump body 200. Front wall 220, including radius cove 225, may be made as a single integral structure, or from a plurality of plates as with floor 210.

Side walls 230A and 230B form the side boundaries of dump body 200. Side walls 220 are joined to two side edges of floor 210 and two side edges of front wall 220. In particular, each side wall 220 is joined at a bottom edge to a side edge of floor 210, and joined at a front edge to a side edge of front wall 220. Each side wall 230 may be made as a single integral structure, or from a plurality of plates as with floor 210.

Cab protector 240, which may also be referred to as a cab shield or cab guard, is a safety feature designed to protect the cab of mobile equipment 100 during loading and transportation. Cab protector 240 may comprise a strong, substantially horizontal barrier extending forward from a top edge of front wall 220 (i.e., opposite of the bottom edge of front wall 220 that is joined to floor 210) over the cab of front portion 110 of mobile equipment 100. A pair of attachment beams 250A and 250B may be attached (e.g., welded) to a bottom side of floor 210. Attachment beams 250 extend substantially in the front-to-rear dimension FR on the bottom side of floor 210. Each attachment beam 250 may comprise a frame engagement element 255.

Frame engagement elements 255 on attachment beams 250 are aligned in side-to-side dimension SS. In particular, frame engagement element 255A on attachment beam 250A is aligned with frame engagement element 255B on attachment beam 250B. Each frame engagement element 255 may comprise a pair of eyelets, extending in side-to-side dimension SS. The pair of eyelets are configured to be seated around a corresponding eyelet on the frame of mobile equipment 100, to thereby form a channel through the eyelets of frame engagement element 255 and the eyelet on the frame of mobile equipment 100. A rod or pin may be inserted in the channel, along side-to-side dimension SS, and fixed within the channel, to thereby fasten frame engagement element 255 to the frame. Frame engagement elements 255 are free to rotate around their respective pins, such that collectively, frame engagement elements 255 form a pivot point, near the rear of dump body 200, around which dump body 200 can rotate.

A pair of piston engagement elements 260A and 260B may be attached (e.g., welded) to a bottom side of floor 210 on either side of the pair of attachment beams 250. In particular, piston engagement element 260A is positioned outward, along side-to-side dimension SS, from attachment beam 250A, and piston engagement element 260B is positioned outward, along side-to-side dimension SS, from attachment beam 250B. Each piston engagement element 260 may be connected to one end of a piston 125. One end of each piston 125 may be connected to the frame of rear portion 120, and the opposite end of each piston 125 may be connected to a respective piston engagement element 260. Thus, when pistons 125 are extended (e.g., by increasing hydraulic pressure), pistons 125 push piston engagement elements 260 upward, thereby raising the front end of dump body 200, while the rear end of dump body 200 pivots around frame engagement elements 255. This tilts dump body 200, such that material within dump body 200 will flow out of the rear of dump body 200.

Figure 3:
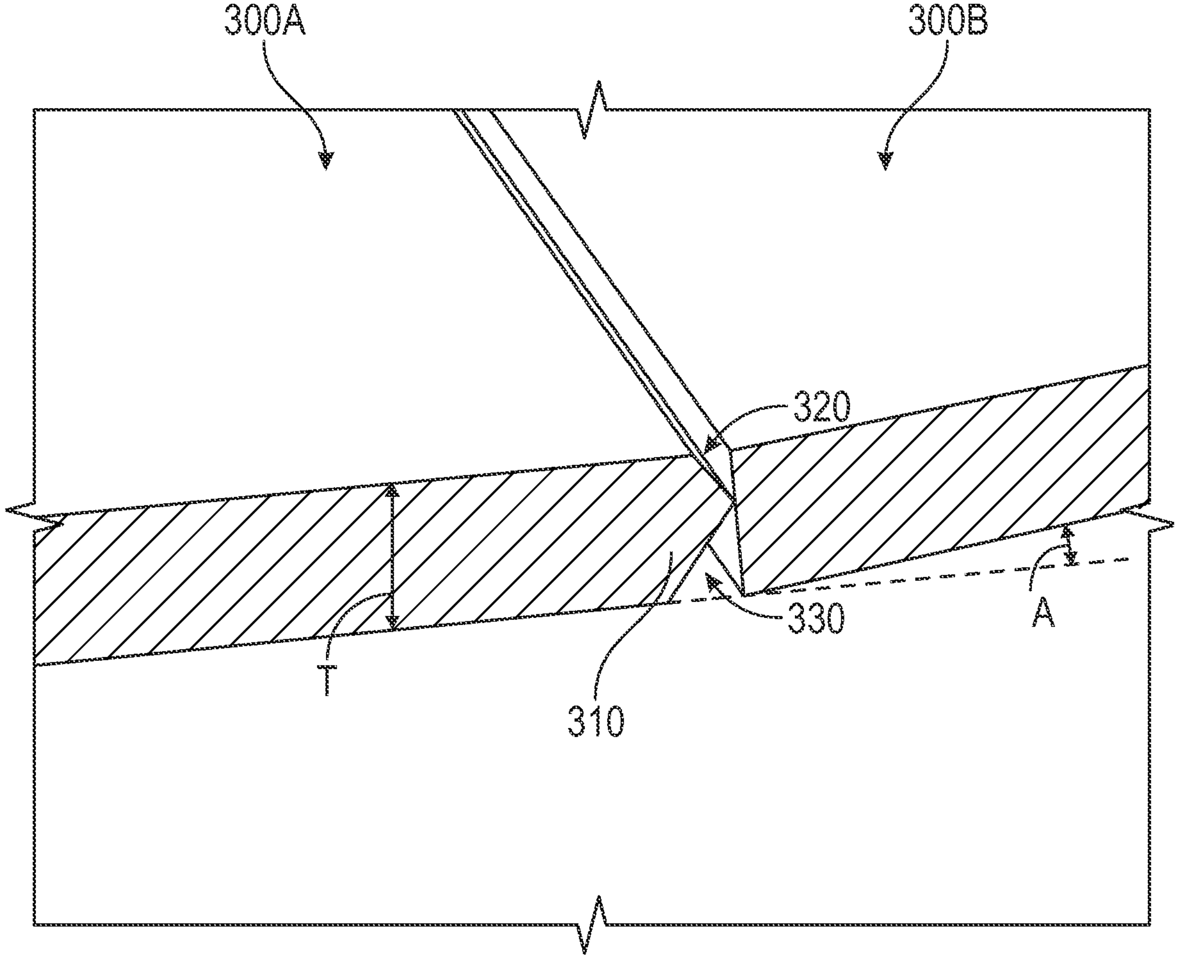
FIG. 3 illustrates two adjacent plates in the floor of a dump body, according to an embodiment.

FIG. 3 illustrates two adjacent plates 300 in floor 210 of dump body 200, according to an embodiment. As previously mentioned, each plate 300 may be planar with a thickness T, and joined to each adjacent plate 300 through welding, bending, and/or other means. In addition, each plate 300 may be joined to each adjacent plate 300 at an angle A. Thickness T may be any thickness, depending on the application. In a particular implementation, thickness T is between 19 and 32 millimeters, and may be thicker than front wall 220 and/or side walls 230. Angle A may be any feasible angle, depending on the application. In a particular implementation, angle A is between 4 and 7 degrees.

Each plate 300 may comprise one or more beveled edges 310. For example, each plate 300 may consist of one beveled edge 310 in front-to-rear dimension FR and one beveled edge 310 in side-to-side dimension SS. In an embodiment, beveled edge 310 is beveled on each side of plate 300, to form gaps 320 and 330 between beveled edge 310 of plate 300A and a non-beveled edge of an adjacent plate 300B. Alternatively, beveled edge 310 could be beveled on only one side of plate 300 (e.g., to form either gap 320 or 330). In either case, beveled edge 310 enables the non-beveled edge of adjacent plate 300B to contact beveled edge 310 of plate 300A at angle A. Once angle A is set, plate 300A may be welded to adjacent plate 300B by welding a consumable or filler into gaps 320 and/or 330, to ensure a strong bond between plates 300A and 300B. Prior to welding, the regions of plates 300A and 300B around the weld region may be preheated, to increase weld quality and reduce cracking and other problems.

It should be understood that the faceted curvature of floor 210 will be dictated by the dimensions of plates 300 and the angles A between adjacent plates 300. For a shallower curvature, angles A may be decreased, whereas, for a deeper curvature, angles A may be increased. In addition, for a smoother curvature, the lengths of plates 300, in either or both front-to-rear dimension FR and side-to-side dimension SS, may be reduced to produce more and smaller facets. Conversely, for a less smooth curvature, the lengths of plates 300, in either or both front-to-rear dimension FR and side-to-side dimension SS, may be increased to produce fewer and larger facets. In general, the smaller the plates 300 are, the more efficient the overall structure is.

INDUSTRIAL APPLICABILITY

It is advantageous for a dump body to be both strong and lightweight. To increase strength, stiffeners may be used. However, stiffeners increase the cost and weight of the dump body. The dump body may also be curved. While curving the dump body can reduce the need for stiffeners, and therefore, the overall weight of the dump body, it increases the cost of the dump body. Accordingly, a dump body 200 is disclosed that achieves the benefits of curvature (i.e., lightweight and strong), without the costs.

In particular, dump body 200 comprises a faceted floor 210. Floor is composed of a plurality of rectangular and planar plates 300 that are joined together (e.g., welded, bent from a single piece of material, etc.) in two dimensions (i.e., front-to-rear dimension FR and side-to-side dimension SS). Adjacent plates 300, which may comprise at least one beveled edge 310 in each dimension, are joined at an angle A (e.g., 4 to 7 degrees, and preferably, 5 to 6.5 degrees) to provide a faceted curvature or pseudo-curvature in each dimension. The degree of faceted curvature in each dimension may be the same or different.

Embodiments of dump body 200 with a faceted curvature in floor 210 offer a variety of benefits. For example, the inventors have found that a floor 210, comprising angled plates 300, has increased rigidity, relative to a flat floor 210. In particular, the joinder of plates 300 at angles A distributes forces more effectively, thereby enhancing the structural integrity of floor 210. In effect, each joined edge acts like a stiffener to provide support to floor 210. This eliminates the need for external stiffeners to support floor 210, which decreases the overall weight of dump body 200 and reduces manufacturing costs.

Furthermore, because plates 300 are planar, they are easier and less expensive to manufacture. In particular, curved plates require rolling, which is a more expensive manufacturing process. In addition, because floor 210 is formed as a set of planar plates 300, plates 300 that are damaged can be easily replaced by simply cutting out the damaged plate 300 and welding in a new plate 300. There is no need to manufacture a new plate or patch with the precise curvature of the damaged portion, since the individual plates 300 do not have any curvature.

In an embodiment, front wall 220 and/or side walls 230 may also be formed of planar plates, identical or similar to plates 300. However, since front wall 220 and side walls 230 may not need to support as much weight as floor 210, the plates forming front wall and/or side walls 230 may have larger dimensions to reduce the number of required plates. The plates of front wall 220 and/or side walls 230 may also be joined at angles (e.g., 4 to 7 degrees) to provide a faceted curvature or pseudo-curvature to front wall 220 and/or side walls 230. However, in an embodiment, front wall 220 may still comprise radius cove 225 to prevent or reduce material hang-up. In this embodiment, radius cove 225 may be the only piece or set of joined pieces of dump body 200 that is curved (e.g., rolled). All other pieces (e.g., plates 300) may be planar. In an alternative embodiment, radius cove 225 could also be formed from planar plates, to form a faceted pseudo-curvature.

In an embodiment, each plate 300 may comprise at least one beveled edge 310, to facilitate welding of adjacent plates 300 at angle A. In particular, beveled edge 310 provides a larger surface area for welding or bonding, and gaps 320 and 330 for consumable or filler material, thereby ensuring a more stable and secure joint. The resulting connection forms a triangular structure, which is inherently stable and resistant to bending and torsional forces. This allows for more effective load distribution across the entire dump body 200 structure, reducing stress concentrations that might occur when plates 300 are connected at a non-zero angle, and increasing durability.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a mining truck, it will be appreciated that it can be implemented in various other types of equipment and machines with dump bodies, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A dump body for a mobile equipment, the dump body comprising:

a floor comprising a plurality of plates arranged in two dimensions, including a front-to-rear dimension and a side-to-side dimension, wherein each of the plurality of plates is planar, and wherein, in both the front-to-rear dimension and the side-to-side dimension, each of the plurality of plates is joined to each adjacent plate at an angle.

2. The dump body of claim 1, wherein, in each of one or both of the front-to-rear dimension and the side-to-side dimension, adjacent pairs of the plurality of plates are joined at a same angle as other adjacent pairs of the plurality of plates in the respective dimension.

3. The dump body of claim 1, wherein, in each of one or both of the front-to-rear dimension and the side-to-side dimension, adjacent pairs of the plurality of plates are joined at an angle in a range of 4 to 7 degrees.

4. The dump body of claim 1, wherein, in each of one or both of the front-to-rear dimension and the side-to-side dimension, adjacent pairs of the plurality of plates are joined at an angle in a range of 5 to 6.5 degrees.

5. The dump body of claim 1, wherein at least one adjacent pair of the plurality of plates in the front-to-rear dimension are joined to each other at a different angle than at least one other adjacent pair of the plurality of plates in the front-to-rear dimension.

6. The dump body of claim 1, wherein at least one adjacent pair of the plurality of plates in the side-to-side dimension are joined to each other at a different angle than at least one other adjacent pair of the plurality of plates in the side-to-side dimension.

7. The dump body of claim 1, wherein at least one adjacent pair of the plurality of plates in the front-to-rear dimension are joined to each other at a different angle than at least one adjacent pair of the plurality of plates in the side-to-side dimension.

8. The dump body of claim 1, wherein each of at least a subset of the plurality of plates is joined to one or more adjacent plates by welding.

9. The dump body of claim 1, wherein at least two or more of the plurality of plates are formed as a single piece of material that is bent to form the angle between adjacent ones of the two or more plates.

10. The dump body of claim 1, further comprising a front wall joined to a front edge of the floor, and two side walls joined to two side edges of the floor and two side edges of the front wall.

11. The dump body of claim 10, further comprising a cab protector extending forward from an edge of the front wall that is opposite an edge of the front wall that is joined to the floor.

12. The dump body of claim 11, wherein the front wall comprises a radius cove that is joined to the front edge of the floor.

13. The dump body of claim 1, wherein each of the plurality of plates comprises one or more beveled edges.

14. The dump body of claim 1, further comprising a pair of attachment beams extending in the front-to-rear dimension on a bottom side of the floor, wherein each of the pair of attachment beams comprises a frame engagement element.

15. The dump body of claim 14 further comprising a pair of piston engagement elements attached to the bottom side of the floor on either side of the pair of attachment beams.

16. A mobile equipment comprising:

a frame;

The dump body of claim 15, wherein the dump body is connected to the frame by the frame engagement element of each of the pair of attachment beams; and a pair of pistons that each comprises a first end and a second end, wherein the first end of each of the pair of pistons is connected to the frame, and wherein the second end of each of the pair of pistons is connected to a respective one of the pair of piston engagement elements.

17. A dump body comprising:

a floor comprising a plurality of plates arranged in two dimensions, including a front-to-rear dimension and a side-to-side dimension, wherein each of the plurality of plates is planar, and wherein, in both the front-to-rear dimension and the side-to-side dimension, each of the plurality of plates is joined to each adjacent plate at an angle;

a front wall joined to a front edge of the floor, two side walls joined to two side edges of the floor and two side edges of the front wall;

a cab protector extending forward from an edge of the front wall that is opposite an edge of the front wall that is joined to the floor; and a pair of attachment beams extending in the front-to-rear dimension on a bottom side of the floor.

18. The dump body of claim 17, wherein each of the pair of attachment beams comprises a frame engagement element and a piston engagement element.

19. The dump body of claim 17, wherein, in each of one or both of the front-to-rear dimension and the side-to-side dimension, adjacent pairs of the plurality of plates are joined at an angle in a range of 4 to 7 degrees.

20. A mobile equipment comprising:

a frame;

a plurality of ground-engagement members attached to the frame;

a cab attached to the frame;

a dump body that includes a floor comprising a plurality of plates arranged in two dimensions, including a front-to-rear dimension and a side-to-side dimension, wherein each of the plurality of plates is planar with beveled edges, and wherein, in both the front-to-rear dimension and the side-to-side dimension, each of the plurality of plates is joined to each adjacent plate at an angle, a front wall joined to a front edge of the floor, two side walls joined to two side edges of the floor and two side edges of the front wall, a cab protector extending, over the cab, from an edge of the front wall that is opposite an edge of the front wall that is joined to the floor, and a pair of attachment beams extending in the front-to-rear dimension on a bottom side of the floor, wherein each of the pair of attachment beams comprises a frame engagement element and a piston engagement element, and wherein the dump body is connected to the frame by the frame engagement element of each of the pair of attachment beams; and a pair of pistons that each comprises a first end and a second end, wherein the first end of each of the pair of pistons is connected to the frame, and wherein the second end of each of the pair of pistons is connected to the piston engagement element of a respective one of the pair of attachment beams.

* * * * *